H. A. BROOKS.
FILTER CLEANING APPARATUS.
APPLICATION FILED MAR. 23, 1917.
1,393,492.
Patented Oct. 11, 1921.
2 SHEETS—SHEET 1.
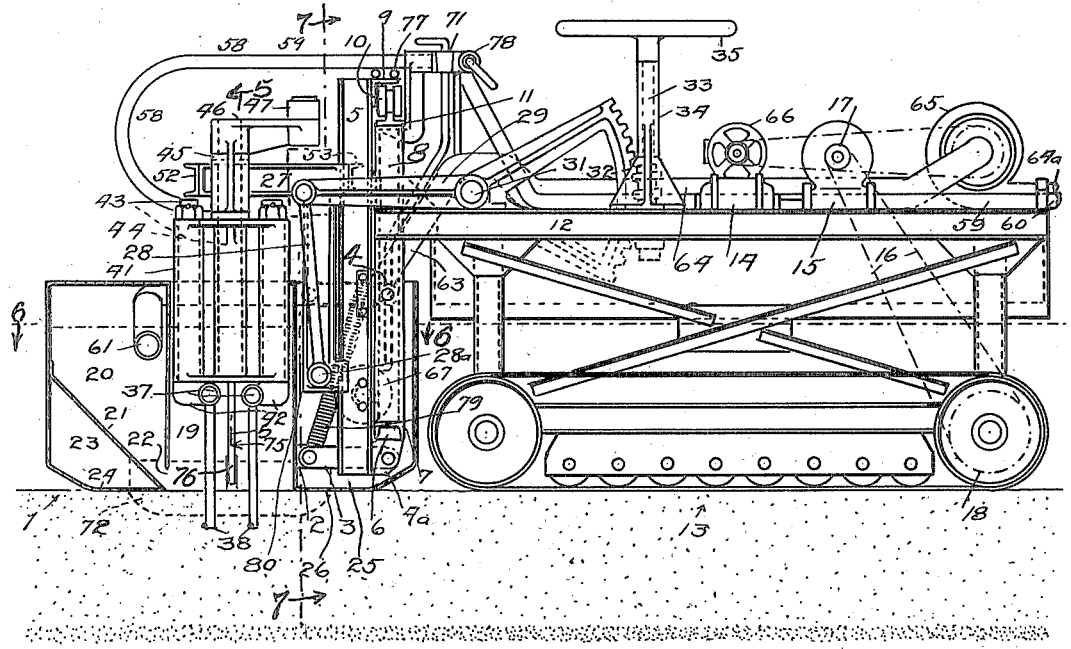
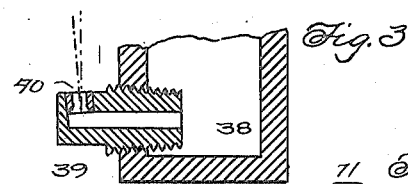
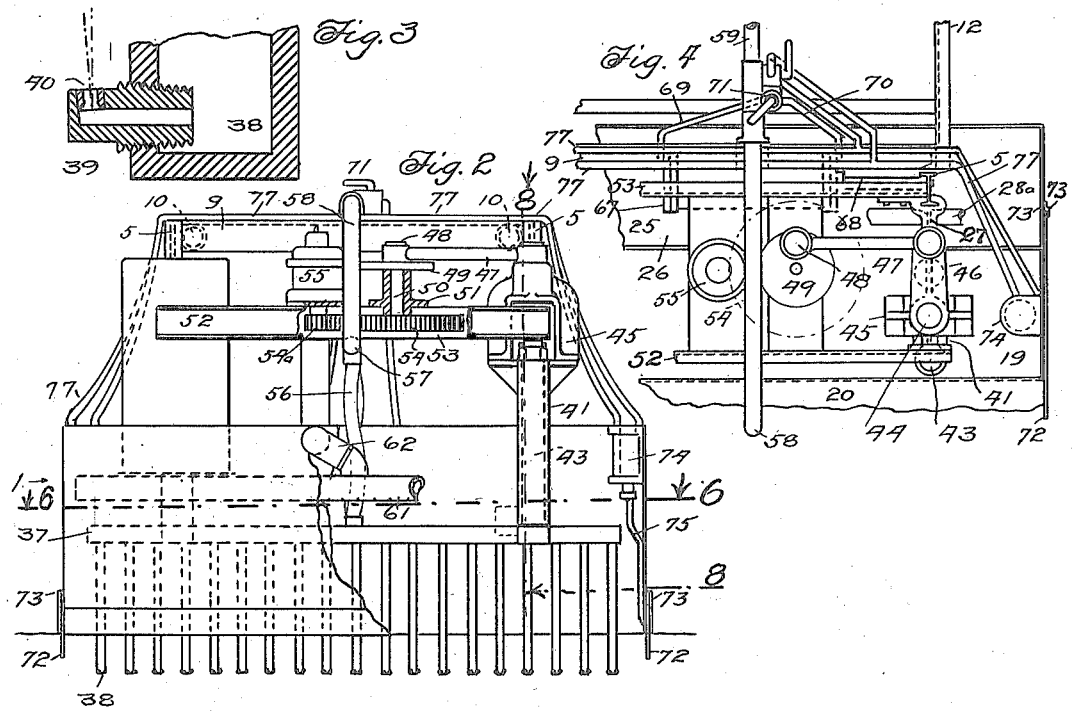
Harry A. Brooks
Inventor

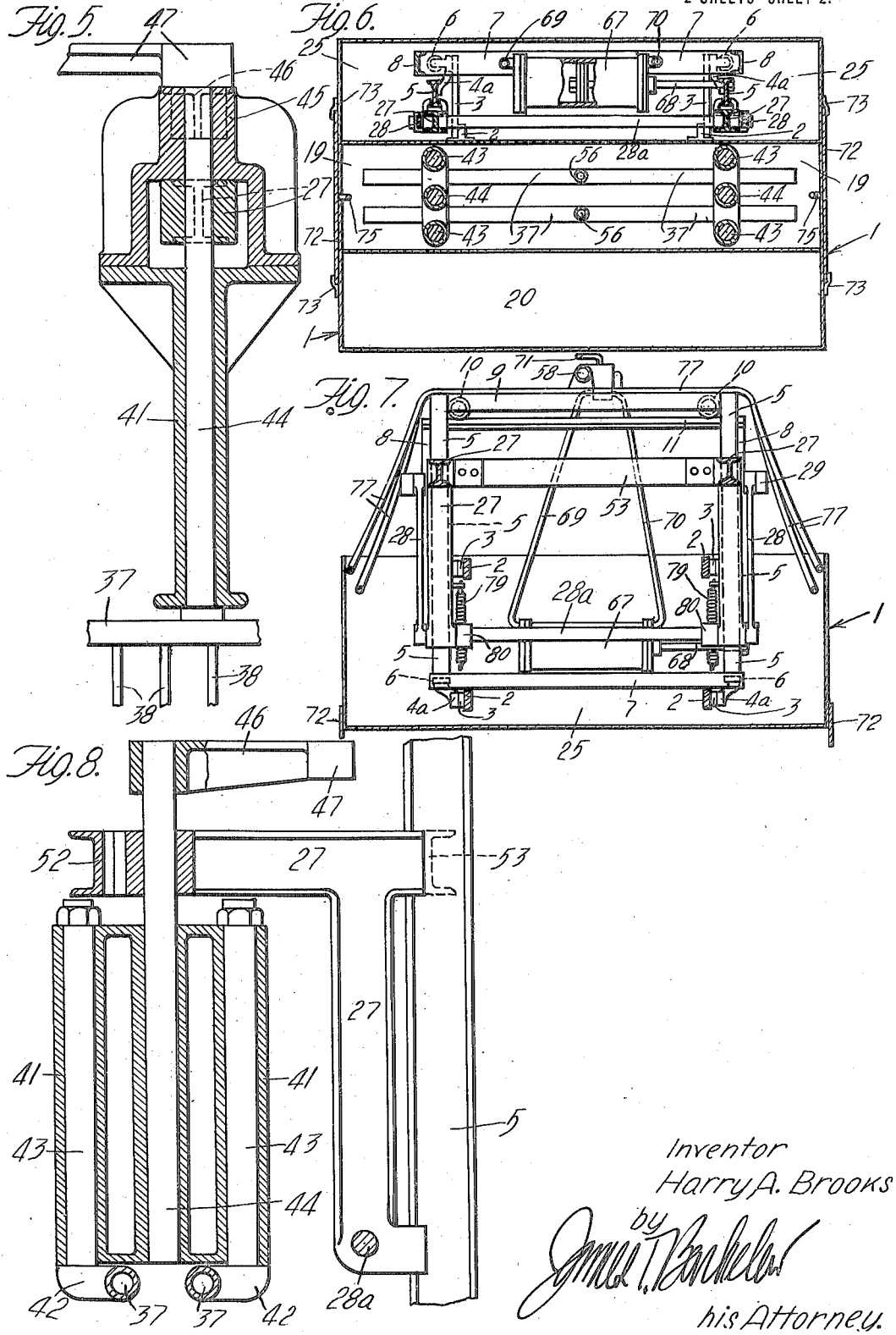

UNITED STATES PATENT OFFICE.

HARRY A. BROOKS, OF GLENDALE, CALIFORNIA, ASSIGNOR TO BLAISDELL COMPANY, OF LOS ANGELES, CALIFORNIA, A CORPORATION.

FILTER-CLEANING APPARATUS.

1,393,492.   Specification of Letters Patent.   Patented Oct. 11, 1921.

Application filed March 23, 1917. Serial No. 159,020.

*To all whom it may concern:*

Be it known that I, HARRY A. BROOKS, a subject of the King of Great Britain, residing at Glendale, county of Los Angeles, State of California, have invented a certain new and useful Filter-Cleaning Apparatus; and I do hereby declare the following to be a full, clear, and exact description of the invention, such as will enable others skilled in the art to which it appertains to make and use the same.

This invention relates to municipal water filtration and more particularly to an apparatus for cleaning filters.

One of the objects of this invention is to provide a filter cleaning apparatus that shall operate to clean uniformly the entire area of the filter bed so that maximum efficiency may be obtained therefrom.

Another object of the invention is to provide means whereby the filter bed may be cleaned to varying depths as desired.

The work of a municipal filter may be the removal of bacteria from the water, clarification, or it may be both. In each instance the greater part of the elimination is accomplished by a comparatively thin layer at the surface of the filtering material, the lower portion not becoming clogged for a considerable time. The removal of inimical bacteria is accomplished by other or friendly bacteria which have their habitat principally in the upper part of the bed and become less numerous in the deeper parts thereof. It is obvious that if the filter is cleaned to its full depth every time its effluent drops below the required quantity, owing to the surface clogging, the growth of these bacteria will be unduly checked and it will become necessary to allow time for the filter to again get into working condition. If, however, only the upper layer of material is cleaned, sufficient of the friendy bacteria are left to render the filter ready for immediate re-use.

So, too, in clarification, the minute inorganic particles are deposited on the surface and the flow is impeded. In some localities this necessitates cleaning the filter every 24 hours or oftener. The top 2 or 3 inches can be cleaned with the present invention at a fraction of the power cost required for the full depth, and at a much more rapid rate.

A further object is to prevent classification, or sizing of the filtering material at various depths. For maximum efficiency it is requisite that the sand include grains of the right sizes in the right proportion and that the various sizes of grains be uniformly distributed throughout the entire depth of the filter bed. Hitherto it has been almost impossible to prevent loss of the finest sizes of sand and a rearrangement of the remainder with the smaller sizes above, the size of the grains increasing with the depth.

This apparatus by being able to wash in position sand finer than hitherto has been possible, and to wash to varying depths promotes efficiency and economy in the operation of municipal filters.

In the drawings Figure 1 is side elevation with parts broken away, Fig. 2 is a front elevation of the caisson, Fig. 3 is an enlarged sectional detail of the lower end of one of the rake teeth, Fig. 4 is a plan detail of the lateral moving appliances for the same, Fig. 5 is an enlarged detail section taken as indicated by line 5—5 on Fig. 1; Fig. 6 is a plan section taken as indicated by line 6—6 on Fig. 1 and also by line 6—6 on Fig. 2; Fig. 7 is a transverse vertical sectional view taken as indicated by line 7—7 on Fig. 1; and Fig. 8 is an enlarged sectional view taken as indicated by line 8—8 on Fig. 2.

A yet further object is to provide an apparatus in which the parts sliding upon the surface of the filter bed shall be free to move vertically to conform to inequalities in the sand filter surface, and to also provide means for partially counterbalancing the weight of the said sliding parts.

Still another object is to provide an apparatus of this class that shall not extend beyond a limited height above the surface of the water in the filter upon which it is operating, so that the said apparatus may be used in existing filters of the covered type.

A still further object is to provide an apparatus of this class that may have its stirring appliances projected laterally to clean between the columns that are used to support the cover or roof of a filter.

Other objects and advantages of the invention will be apparent from the consideration of the following description of one form of apparatus in which the invention may be embodied although it is apparent that various changes and modifications may be made therein, and it is to be understood that nothing contained in the description of this particular apparatus is to be construed as a relinquishment of the right of any such changes or modifications as do not depart from the spirit and scope of the invention.

Referring now to Figs. 1 and 2, there is shown a structure 1 which for convenience I may term a "caisson," for the reason that its function is to separate, and prevent intermingling between the fluid on the outside and that on the inside of this caisson. This caisson,—semi-buoyant in this instance,—attached by means of brackets 2 and links 3 to brackets 4 carried by vertical I beams 5. Lower brackets 4ª have rollers 6 which engage the flanges of channel 7 fastened at each end to vertical channels 8. The upper ends of I beams 5 are connected by transverse angle bar 9 which at each end carries a roller 10 supported on the upturned stem of T bar 11 fastened to the upper ends of channels 8. Channels 8 are carried by the forwardly extending ends of side channels 12 of the traveling structure 13. As illustrated it is of the caterpillar type. It is propelled by motor 14 through worm gear 15 and chain 16 on sprocket wheels 17 and 18 as will be readily seen from Fig. 1. Details of the construction of traveling structure 13 are not given here as they form no part of the present invention.

Caisson 1 is provided with a central well or chamber 19, open at the bottom. The front part of caisson 1 consists of settling chamber 20 having a bottom 21 sloping downwardly toward opening 22 communicating with well 19. Below bottom 21 is a buoyancy space 23 above front sliding shoe 24. At the rear of caisson 1 is rear buoyancy chamber 25 closed at the bottom by a rear sliding shoe 26. As will be seen from Figs. 1 and 6 channel 7 and its appurtenances as well as the lower part of I beams 5 and channels 8 are within rear chamber 25. Slidably mounted on the forward flanges of I beam 5 are brackets 27 supported by links 28 pivotally attached near their lower ends by rod 28ª. The upper ends of links 28 are pivotally attached to lifting levers 29 keyed to transverse shaft 31 actuated by worm 32 on shaft 33 supported by bracket 34 attached to one of side channels 12. This lifting mechanism may be manually operated by hand wheel 35 keyed to shaft 33.

The sand cleaning or washing appliances in the present instance consists of hollow rakes 37 having tubular teeth 38 affixed thereto. The lower ends of the teeth are closed, see Fig. 3, and have screwed therein plugs 39 provided with orifices 40 preferably set at a slight angle with the axis of the teeth. With the plugs on the forward side only of the teeth there is very little upward flow of water at the rear of the teeth, allowing the finer sand particles to be thoroughly stirred into the depths of the filter bed.

Rakes 37 are given opposite reciprocatory movements by rockers 41 to which they are attached by brackets 42 carried on the lower ends of studs 43 (shown in dotted lines in Figs. 1 and 2 and in detail in Figs. 5 and 8). Rockers 41 are carried on shafts 44, shown in dotted lines Fig. 1 and in detail in Figs. 5 and 8, rigidly affixed to the forward ends of brackets 27 and supported by yokes 45,— only one of which is shown—bolted to rockers 41. Formed integral with or attached to one of yokes 45 is a crank 46 connected by pitman 47 with crank pin 48 on crank disk 49 keyed to shaft 50 rotatively mounted in frame 51 carried by channels 52 and 53 supported by brackets 27. These yokes pass around and straddle the brackets 27. To the lower end of shaft 50 is keyed gear 54 meshing with pinion 54ª of motor 55.

Water under pressure is supplied to each of the rakes 37 by a flexible hose 56. Hose 56 at their upper ends join pipe 57 connected by hose 58 to pipe 59 passing to the rear of the apparatus where it is attached to trailing hose 60 connected to any suitable source of water pressure.

In settling chamber 20 near the top thereof is affixed perforated suction pipe 61 which at its middle is attached to pipe 62, the latter connected by hose 63 to suction pipe 64 of pump 65 driven by a motor 66. The discharge of pump 65 is connected to trailing hose 64ª.

Most existing filters are of the under arch type, the cover consisting of groined arches supported on columns rising from the floor of the filter. In order that practically all of the filter surface may be washed or cleaned means have been provided, in the apparatus under consideration, for giving the caisson 1 a lateral movement to allow it to pass the columns. It will be seen from Figs. 4 and 7 that the traveling structure is somewhat narrower than the caisson. A hydraulic cylinder 67 is attached to channel 7 its piston rod 68 being attached to one of I beams 5, see Figs. 4, 6 and 7. Pipes 69 and 70 connect cylinder 67 to a 4-way valve 71 within convenient reach of the operator, as shown in Fig. 7.

To prevent the ingress of water at the sides of well 19, knives or runners 72 are vertically slidable in guides 73 affixed to the sides of caisson 1. The knives extend into the sand a slight depth and are rounded at their front and rear ends. When it is desired to shift the caisson laterally, these knives are raised by hydraulic cylinders 74 the piston rods 75 of which have extensions 76 attached to the said knives. Water under pressure may be admitted to the cylinders 74 by pipes 77 leading to 4-way valve 78. Valves 71 and 78 are connected to pipe 59.

In addition to the buoyancy chambers of caisson 1 tension springs 79 attached at their lower ends to caisson and at their upper ends to I beams 5 may be used to lessen the pressure of shoes 24 and 26 upon the filter surface or the spring counterpoise may be used alone, as may be found advisable in other embodiments of the invention.

In order that the apparatus may be moved from place to place as required a lug 80 is provided on the lower part of each of brackets 27 which when the latter approach the upper limit of their movement contact with the upper pair of brackets 2 and raise the caisson clear of the ground. This will be clearly seen in Fig. 7 of the drawings.

In the operation of this apparatus electric current from any suitable source, and conveyed, for instance, by a trailing cable, having been supplied to motor 55 the latter operates to reciprocate the rakes 37. Water is then supplied to the teeth by the means described. Motor 66 is next started, after which the teeth are lowered as far as desired into the sand by hand wheel 35. Motor 14 is then put in operation to drive the apparatus forward.

Upon nearing a column. valve 78 is operated to allow water to flow to the lower ends of cylinders 74. Valve 71 is then operated to move the caisson to pass the column, and the knives lowered. After passing the column the caisson is returned to its normal position.

I claim—

1. In a filter cleaning apparatus, a caisson containing a chamber open at its lower end and adapted to rest on the surface of a filter bed, carriage means for moving the caisson over the surface of the filter bed, sand cleaning appliances in and beneath said caisson, both the caisson and the cleaning appliances being mounted on the carriage means to be vertically movable thereon independently of each other.

2. In a filter cleaning apparatus, a caisson containing a chamber open at its lower end and adapted to rest on the surface of a filter bed, a sand separating chamber in the caisson in communication with the open bottomed chamber, appliances located in said open bottomed chamber for cleaning sand in place, a carriage upon which the caisson and the appliances are mounted and carried, said caisson and said appliances being each vertically movable in the carriage independently of the other.

3. In filter cleaning apparatus, a traveling structure, sand cleaning appliances adjustably carried thereby, a caisson over and around the appliances and having an open bottom adapted to rest upon a filter surface, and means for yieldingly carrying the caisson on the structure independently of the sand cleaning appliances whereby the caisson may follow and remain in contact with an uneven surface.

4. In filter cleaning apparatus, a plurality of reciprocating cleaning appliances embodying sand disturbing members having opposite reciprocation, means for operating the same, and means for progressing the same over a filter bed.

5. In filter cleaning apparatus, in combination, a traveling structure, a vertically movable frame supported thereon, a plurality of rakes supported on said frame, and means for giving said rakes reciprocating motions transversely of the direction of travel of said structure, one of said rakes having a motion in reverse to another.

6. In filter cleaning apparatus, in combination, a traveling structure and a rake having a reciprocating movement transversely of the direction of travel of said structure, teeth on said rake, orifices in said teeth and means for supplying water under pressure to said orifices.

7. In a filter cleaning apparatus, an open bottomed caisson, means for moving the same over a filter bed, a rake extending beneath said caisson to project into the filter bed, and power-operated means for giving said rake a continuous reciprocating motion in relation to said caisson, transversely to the line of travel of said caisson.

8. In filter cleaning apparatus, a structure adapted to travel over a filter bed, sand cleaning appliances embodying members adapted to project downwardly into the sand carried on the structure, and power operated means to continuously reciprocate said members back and forth transversely to the line of travel of said structure, so that said members travel in zig-zag paths through the sand.

9. In filter cleaning apparatus, a structure adapted to travel over a filter bed, sand cleaning appliances embodying two sets of members adapted to project downwardly into the sand carried on the structure, and means to reciprocate said sets of members back and forth in opposite motions transversely to the line of travel of the structure, so that each set is moving transversely opposite to the movement of the other set, and so that each set travels in a zig-zag path through the sand.

10. In filter cleaning apparatus, a caisson adapted to be moved over the surface of a filter bed, sand stirring appliances in the caisson embodying members projecting downwardly into the sand, and means to reciprocate said members back and forth transversely to the line of movement of the caisson, and means to circulate cleaning water around the stirring members and in the caisson.

11. In filter cleaning apparatus, a caisson adapted to be moved over the surface of a filter bed, sand stirring appliances in the caisson embodying members projecting downwardly into the sand, and means to reciprocate said members back and forth transversely to the line of movement of the caisson, said members being arranged in a plurality of sets, and the movement of one set being opposite to the movement of another, and means to circulate cleaning water around the stirring members and in the caisson.

12. In a filter cleaning apparatus, an open bottomed caisson, means for carrying the caisson and moving it over a filter bed, a sand cleaning appliance within the caisson and adapted to project below it into the filter bed, and means for adjustably supporting the caisson and the sand cleaning appliance on the carrier which permits them to be vertically movable independently of each other.

13. In a filter cleaning apparatus, an open bottomed caisson, means for carrying the caisson and moving it over a filter bed, a sand cleaning appliance within the caisson and adapted to project below it into the filter bed, means for adjustably supporting the caisson and the sand cleaning appliance on the carrier which permits them to be vertically movable independently of each other, means for raising the sand cleaning appliance, and coöperating means on the appliance and on the caisson adapted to cause the caisson to rise with the appliance after the appliance has been raised up into the caisson.

In testimony whereof I have signed my name to this specification at Los Angeles, county of Los Angeles, State of California, this 29th day of May, A. D. 1916.

HARRY A. BROOKS.